United States Patent

[11] 3,625,988

| [72] | Inventor | Henryk A. Cyba<br>Evanston, Ill. |
|---|---|---|
| [21] | Appl. No. | 720,339 |
| [22] | Filed | Apr. 10, 1968 |
| [45] | Patented | Dec. 7, 1971 |
| [73] | Assignee | Universal Oil Products Company<br>Des Plaines, Ill.<br>Continuation-in-part of application Ser. No. 329,979, Dec. 12, 1963, now abandoned.<br>This application Apr. 10, 1968, Ser. No. 720,339 |

[54] REACTION PRODUCT OF CERTAIN ACID AND ALKANOLAMINE
17 Claims, No Drawings

[52] U.S. Cl. ................................................... 260/468 B,
252/8.1, 252/37.2, 252/49.6, 252/51.5 A, 252/57,
252/390, 252/392, 252/396, 260/45.85, 260/45.9
R, 260/75 N, 260/78 TF, 260/78 UA, 260/485 G,
260/485 H, 260/514 B, 260/557 B, 260/617 F

[51] Int. Cl. ....................................................... C07c 97/06
[50] Field of Search ........................................... 260/468 B

[56] References Cited
UNITED STATES PATENTS
3,499,905   3/1970   Koch ............................ 260/294.3

*Primary Examiner*—Lewis Gotts
*Assistant Examiner*—Robert Gerstl
*Attorneys*—James R. Hoatson, Jr. and Bernard L. Kramer

ABSTRACT: Reaction product formed by the condensation of certain alkanolamines with polyhalopolyhydropolycyclic-dicarboxylic acids of the formula hereinafter given, its corresponding anhydride, corresponding diol or ester. These compounds have utility as stabilizers against deterioration of organic substances, such as lubricants, hydrocarbon oils and plastics, as well as possessing insecticidal properties.

REACTION PRODUCT OF CERTAIN ACID AND ALKANOLAMINE

CROSS-REFERENCE TO RELATED APPLICATIONS

This is a continuation-in-part of copending application Ser. No. 329,979, filed Dec. 12, 1963, now abandoned.

DESCRIPTION OF THE INVENTION

This application relates to a novel composition of matter comprising the reaction product of a particular type of dicarboxylic acid or derivative thereof with an alkanolamine.

In one embodiment, the present invention relates to the reaction product of a compound selected from the group consisting of polyhalopolyhydropolycyclicdicarboxylic acid and derivative thereof with an alkanolamine.

In another embodiment, the present invention relates to the use of the reaction product as an additive in organic substances including hydrocarbon oils and particularly lubricants, as well as plastics, textiles, etc., requiring flame-proofing properties.

As hereinbefore set forth, the reaction product of the present invention is prepared by the reaction of a particular dicarboxylic acid or derivative thereof with an alkanolamine. The particular type of acid for use in the present invention is a polyhalopolyhydropolycyclicdicarboxylic acid and, in a preferred embodiment, comprises the acid or the anhydride thereof. Any suitable acid or anhydride meeting these requirements is used in accordance with the present invention. In one embodiment the acid or anhydride is of the type known in the art as "Chlorendic" or "HET" acid or anhydride. This acid is prepared by the Diels-Alder addition reaction of maleic acid and hexachorocyclopentadiene or more conveniently by the reaction of maleic anhydride and hexachlorocyclopentadiene to form the corresponding anhydride and then hydrolyzed to form the acid. The corresponding anhydride is prepared by the reaction of maleic anhydride and hexachlorocyclopentadiene. This acid or anhydride also may be named 1,4,5,6,7,7-hexachlorodicyclo-(2.2.1)-5-heptene-2,3-dicarboxylic acid or the corresponding anhydride. These compounds are prepared by the reaction of equal molar quantities of the reactants, generally by refluxing preferably at about 350° F. in the presence of a solvent. These reactions are well known in the art and are described, for example, in U.S. Pat. No. 2,606,910 and elsewhere.

In place of maleic acid or maleic anhydride, it is understood that other suitable dicarboxylic acids containing carbon to carbon unsaturation may be employed. Illustrative examples include fumaric acid, itaconic acid, citraconic acid, glutaconic acid, etc. Also, in place of hexachlorocyclopentadiene, other suitable halo-substituted cycloalkadienes may be used. Illustrative examples include 1,2-dichlorocyclopentadiene, 1,5-dichlorocyclopentadiene, 1,2,3-trichlorocyclopentadiene, 1,2,3,4-tetrachlorocyclopentadiene, 1,2,3,4,5-pentachlorocyclopentadiene and similar compounds in which all or part of the chlorine is replaced by other halogen and particularly bromine.

A particularly preferred polyhalopolyhydropolycyclicdicarboxylic acid or anhydride is prepared by the Diels-Alder condensation of a conjugated aliphatic diene with an olefinic dicarboxylic acid and then further condensing the resultant cyclohexenedicarboxylic acid with a halocycloalkadiene. A specifically preferred reaction product is the Diels-Alder condensation of 1,3-butadiene with maleic anhydride to form 1,2,3,6-tetrahydrophthalic anhydride, followed by the Diels-Alder condensation with hexachlorocyclopentadiene. The product may be named 5,6,7,8,9,9-hexachloro-1,2,3,4,4a,5,8,8a-octahydro-5,8-methano-2,3-naphthalenedicarboxylic anhydride, hereinafter referred to as "A" anhydride. The corresponding acid is prepared preferably by starting with maleic anhydride as above and hydrolyzing the formed "A" anydride to the "A" acid. The acid may be named 5,6,7,8,9,9-hexachloro-1,2,3,4,4a,5,8,8a-octahydro-5,8-methano-2,3-naphthalene-dicarboxylic acid, hereinafter referred to as "A" acid. Here again, other conjugated aliphatic dienes may be used including, for example, 2-methyl-1,3-butadiene, 1,3-pentadiene, 1,3hexadiene, 2,4hexadiene, 2,3-dimethyl-1,3butadiene, 1,3-heptadiene, 2,4-heptadiene, conjugated nonadienes, etc., halodienes as, for example, chloroprene and particularly 1-chlorobutadiene and 1,4-dichlorobutadiene. Similarly, other unsaturated dicarboxylic acids may be used including fumaric acid, itaconic acid, citraconic acid, glutaconic acid, mesaconic acid, etc. Also, other halocycloalkadienes may be used including, for example, those specifically hereinbefore set forth. The preparation of these compounds also is known in the art and is set forth in detail in U.S. Pat. No. 3,017,431.

Still another preferred polyhalopolyhydropolycyclicdicarboxylic acid or anydride is prepared by condensing cyclopentadiene with maleic acid or maleic anhydride to form norborn-5-ene-2,3-dicarboxylic acid or anhydride and then condensing the same with hexachlorocyclopentadiene. The product may be named 5,6,7,8,9,9-hexachloro-1,2,3,4,4a5,8,8a-octahydro-1,4,5,8,-dimethano-2,3-naphthalenedicarboxylic acid or anhydride, hereinafter referred to as "B" acid and "B" anhydride respectively. Here again, it is understood that other conjugated cycloaliphatic dienes, other unsaturated dicarboxylic acids or anhydrides and other polyhalocycloalkadienes may be used to prepare suitable polyhalopolyhydropolycyclicdicarboxylic acids or anhydrides.

From the above, it will be seen that any suitable polyhalopolyhydropolycyclicdicarboxylic acid or anhydride may be used in accordance with the present invention. The polyhalopolyhydropolycyclicdicarboxylic acid may be illustrated by the following general structure:

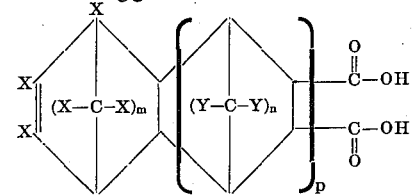

in which X is selected from the group consisting of halogen and particularly chlorine and/or bromine, hydrogen and an alkyl radical of from one to 10 and preferably from one to four carbon atoms, at least two of the X's being halogen, Y is selected from the group consisting of halogen, hydrogen and an alkyl radical of one to 10 and preferably from one to four carbon atoms, $m$ is an integer of from one to four, $n$ ranges from zero to four and $p$ ranges from zero to four.

The above structure illustrates the dicarboxylic acid. In the interest of simplicity, the corresponding anhydride is not being illustrated, but is readily ascertainable from the above structure.

Referring to the above structure, when X is chlorine, $m$ is one, $n$ is zero and $p$ is zero, the compound is 1,4,5,6,7,7-hexachlorobicyclo-(2.2.1)-5-heptene-2,3-dicarboxylic acid or the corresponding anhydride. Similarly, when X is chlorine, $m$ is one, $n$ is zero and $p$ is one, the compound is 5,6,7,8,9,9-hexachloro-1,2,3,4,4a,5,8,8a-octahydro-5,8-methano-2,3-naphthalenedicarboxylic acid or the corresponding anhydride. Also, when X is chlorine, Y is hydrogen, $m$ is one, $n$ is one and $p$ is one, the compound is 5,6,7,8,9,9hexachlro-1,2,3,4,4a,5,8,8a-octahydro-1,4,5,8-dimethano-2,3-napththalenedicarboxylic acid or the corresponding anhydride.

While the particular acid or anhydride set forth above is preferred, it is understood that an ester of the acid may be used for reacting with the alkanolamine. Any suitable ester may be used and is prepared by reacting the acid or anhydride with an alcohol under conditions to liberate water. While the alcohol may contain from one to 18 carbon atoms, it preferably contains one to four carbon atoms. Illustrative alcohols include methanol, ethanol, propanol, butanol, pentanol, hexanol, etc.

In still another embodiment the corresponding mono or diol of the dicarboxylic acids set forth above may be used. The diol is readily prepared by reacting hexachlorocyclopentadiene with 1,4-butenediol in a manner similar to that described previously to form the diol corresponding to "Chlorendic" acid. In another example, the diol is prepared by reacting hexachlorocyclopentadiene with alpha-allyl glycerol ether. These reactions are well known in the art and are described for example, in U.S. Pat. No. 3,007,958. Similarly, hexachlorocyclopentadiene is reacted with 2,3-dimethanolcyclohex-5-ene to form the diol corresponding to the "A" acid. It is understood that any suitable mono or diol of the dicarboxylic acid set forth above may be used for reacting with the alkanolamine. In another embodiment the diol is reacted with a dicarboxylic acid or anhydride, either prior to or simultaneously with the reaction with the alkanolamine. Illustrative dicarboxylic acids include malonic acid, succinic acid, glutaric acid, adipic acid, pimelic acid, suberic acid, azelaic acid, sebacic acid, etc., and the corresponding anhydrides. The reaction is readily effected by refluxing the mixture, preferably in the presence of a solvent including aromatic hydrocarbons as benzene, toluene, xylene, cumene, etc., or other solvents such as decalin.

As hereinbefore set forth, the dicarboxylic acid, anhydride, ester and/or diol is reacted with an alkanolamine. In one embodiment the alkanolamine comprises a monoalkanolamine, preferably containing from two to twenty carbon atoms, including ethanolamine, propanolamine, butanolamine, pentanolamine, hexanolamine, heptanolamine, octanolamine, nonanolamine, decanolamine, undecanolamine, dodecanolamine, tridecanolamine, tetradecanolamine, pentadecanolamine, hexadecanolamine, heptadecanolamine, ocatadecanolamine, nonadecanolamine, eicosanolamine, etc., and particularly these alkanolamines in which one or or both of the amino hydrogens is replaced by an alkyl group, the alkyl group containing from one to 50 and preferably from one to 20 carbon atoms. Illustrative substituted alkanolamines include N-methyl-ethanolamine, N-ethyl-ethanolamine, N-propyl-ethanolamine, N-butyl-ethanolamine, N-pentyl-ethanolamine, N-hexyl-ethanolamine, N-heptyl-ethanolamine, N-octyl-ethanolamine, N-nonyl-ethanolamine, N-decyl-ethanolamine, N-undercyl-ethanolamine, N-dodecyl-ethanolamine, N-tridecyl-ethanolamine, N-tetradecyl-ethanolamine, N-pentadecyl-ethanolamine, N-hexadecyl-ethanolamine, N-heptadecyl-ethanolamine, N-octadecyl-ethanolamine, N-nonadecyl-ethanolamine, N-eicosyl-ethanolamine, etc., N,N-dimethyl-ethanolamine, N,N-diethyl-ethanolamine, N,N-dipropyl-ethanolamine, N,N-dibutyl-ethanolamine, N,N-dipentyl-ethanolamine, N,N-dihexyl-ethanolamine, N,N-diheptyl-ethanolamine, N,N-dioctyl-ethanolamine, N,N-dinonyl-ethanolamine, N,N-didecyl-ethanolamine, N,N-diundecyl-ethanolamine, N,N-didodecyl-ethanolamine, N,N-ditridecyl-ethanolamine, N,N-ditetradecyl-ethanolamine, N,N-dipentadecyl-ethanolamine, N,N-dihexadecyl-ethanolamine, N,N-diheptadecyl-ethanolamine, N,N-dioctadecyl-ethanolamine, N,N-dinonadecyl-ethanolamine, N,N-dieicoxyl-ethanolamine, etc., as well as similarly substituted alkanolamines in which the alkanol moiety contains from three to 20 carbon atoms. It is understood that the alkanolamine may contain an aliphatic substituent attached to one or more of the carbon atoms forming the alkanol group. Furthermore, it is understood that a mixture of the alkanolamines may be used, preferably being selected from those hereinbefore set forth, and also that the substitution may comprise cycloalkyl and particularly cyclohexyl.

In another and preferred embodiment, the alkanolamine contains at least two hydroxyl groups and one amino group or at least one hydroxyl group and two amino groups. The use of such alkanolamines results in a polymer formation. The embodiment of the alkanolamine containing two hydroxyl and one amino groups are dialkanolamines and preferably N-aliphatic-dialkanolamines in which the aliphatic group attached to the nitrogen atom contains from one to about 50 carbon atoms and preferably from about eight to about 22 carbon atoms. In a particularly preferred embodiment, the aliphatic group contains from one to about 20 carbon atoms each. The alkanol groups preferably contain from about two to about four carbon atoms each, although it is understood that they may contain up to about 20 carbon atoms each. Preferably the N-aliphatic-dialkanolamine is an N-alkyl-diethanolamine. Illustrative compounds include N-methyl-diethanolamine, N-ethyl-diethanolamine, N-propyl-diethanolamine, N-butyl-diethanolamine, N-pentyl-diethanolamine, N-hexyl-diethanolamine, N-heptyl-diethanolamine, N-octyl-diethanolamin, N-nonyl-diethanolamine, N-decyl-diethanolamine, N-undecyl-diethanolamine, N-dodecyl-diethanolamine, N-tridecyl-diethanolamine, N-tetradecyl-diethanolamine, N-pentadecyl-diethanolamine, N-hexadecyl-diethanolamine, N-heptadecyl-diethanolamine, N-octadecyl-diethanolamine, N-nonadecyl-diethanolamine, N-eicosyl-diethanolamine, etc. Still other illustrative compounds include N-heneicosyl-diethanolamine, N-docosyl-diethanolamine, N-tricosyl-diethanolamine, N-tetracosyl-diethanolamine, N-pentacosyl-diethanolamine, N-hexacosyl-diethanolamine, N-heptacosyl-diethanolamine, N-octacosyl-diethanolamine, N-nonacosyl-diethanolamine, N-triacontyl-diethanolamine, N-hentriacontyl-diethanolamine, N-dotriacontyl-diethanolamine, N-tritriacontyl-diethanolamine, N-tetratria-contyl-diethanolamine, N-pentatriacontyl-diethanolamine, N-hexatriacontyl-diethanolamine, N-heptatriacontyl-diethanolamine, N-octatriacontyl-diethanolamine, N-nonatriacontyl-diethanolamine, N-tetracontyl-diethanolamine, N-hentetracontyl-diethanolamine, N-dotetracontyl-diethanolamine, N-tritetracontyl-diethanolamine, N-tetratetracontyl-diethanolamine, N-pentatetracontyl-diethanolamine, N-hexatetracontyl-diethanolamine, N-heptatetracontyl-diethanolamine, N-octatetracontyl-diethanolamine, N-nonatetracontyl-diethanolamine, N-pentacontyl-diethanolamine, etc. In some cases, N-alkenyl-diethanolamines may be utilized. Illustrative N-alkenyl-diethanolamines include N-hexenyl-diethanolamine, N-heptenyl-diethanolamine, N-octeny-diethanolamine, N-noneyl-diethanolamine, N-decenyl-diethanolamine, N-undecenyl-diethanolamine, N-dodecenyl-dietanolamine, N-tridecenyl-diethanolamine, N-tetradecenyl-diethanolamine, N-pentadecenyl-diethanolamine, N-hexadecenyl-diethanolamine, N-heptadecenyl-diethanolamine, N-octadecenyl-diethanolamine, N-nonadecenyl-diethanolamine, N-eicosenyl-diethanolamine, etc.

It is understood that the N-aliphatic-diethanolamines may contain an aliphatic substituent attached to one or both of the carbon atoms forming the ethanol groups. These compounds may be illustrated by N-aliphatic-di-(1-methyl-ethanolamine), N-aliphatic-di-(1ethyl-ethanolamine), N-aliphatic-di-(1-propyl-ethanolamine), N-aliphatic-di-(1-butyl-ethanolamine), N-aliphatic-di-(1-pentyl-ethanolamine), N-aliphatic-di-(1-hexyl-ethanolamine), etc., N-aliphatic-di-(2-methyl-ethanolamine), N-aliphatic-di-(2N-aliphatic-di-(2-propyl-ethanolamine), N-aliphatic-di-(2-butyl-ethanolamine), N-aliphatic-di-(2-pentyl-ethanolamine), N-aliphatic-di-(2-hexyl-ethanolamine etc. It is understood that these specific compounds are illustrative only and that other suitable compounds containing diethanolamine configuration may be employed.

The specific compounds hereinbefore set forth are examples of N-aliphatic-diethanolamines. Other N-aliphatic-dialkanolamines include N-aliphatic-dipropanolamines and N-aliphatic-dibutanolamines, although N-aliphatic-dipentanolamines, N-aliphatic-dihexanolamines and higher dialkanolamines may be used in some cases. It is understood that these dialkanolamines may be substituted in a manner similar to that specifically described hereinbefore in connection with the discussion of the diethanolamines. Furthermore, it is understood that mixtures of N-aliphatic-dialkanolamines may be employed, preferably being selected from those hereinbefore set forth, and also that the substitution may comprise cycloalkyl and particularly cyclohexyl. Also, it is understood that the various dialkanolamines are not necessarily equivalent.

A number of N-alkyl-diethanolamines are available commercially and are advantageously used in preparing the condensation product. For example, N-tallow-diethanolamine is available under the trade name of "Ethomeen T/12." This material is a gel at room temperature, has an average molecular weight of 354 and a specific gravity at 25°/25° C. of 0.916. The alkyl substituents contain from about 12 to 20 carbon atoms per group and mostly 16 to 18 carbon atoms. Another mixed product is available commercially under the trade name of "Ethomeen S/12" and is N-soya-diethanolamine. It is a gel at room temperature, has an average molecular weight of 367 and a specific gravity at 25°/25° C. of 0.911. The alkyl substituents contain 16 to 18 carbon atoms per group. Still another commercial product is "Ethomeen C/12, " which is N-coco-diethanolemine,, and is a liquid at room temperature, and has an average molecular weight of 303 and a specific gravity at 25°/25° C. of 0.874. The alkyl groups contain mostly 12 carbon atoms per group, although it also contains groups having from eight to 16 carbon atoms per group. Still another commercially available product is N-stearyl-diethanolamine, which is marketed under the trade name of "Ethomeen 18/12. " This product is a solid at room temperature, has an average molecular weight of 372 and a specific gravity at 25°/25° C. of 0.959. It contains 18 carbon atoms in the alkyl substituent.

When the alkanolamine contains one hydroxyl and two amino groups, a preferred alkanolamine is aminoalkyl alkanolamine. The alkanolamine preferably contains from four and preferably from six to about 50 carbon atoms. Illustrative compounds include aminoethyl ethanolamine, aminoethyl propanolamine, aminoethyl butanolamine, aminoethyl pentanolamine, aminoethyl hexanolamine, etc., aminopropyl ethanolamine, aminopropyl propanolamine, aminopropyl butanolamine, aminopropyl pentanolamine, aminopropyl hexanolamines etc., aminobutyl ethanolamine, aminobutyl propanolamine, aminobutyl butanolamine, aminobutyl pentanolamine, aminobutyl hexanolamine, etc., aminopentyl ethanolamine, aminopentyl propanolamine, aminopentyl butanolamine, aminopentyl pentanolamine, aminopentyl hexanolamine, etc., aminohexyl ethanolamine, aminohexyl propanolamine, aminohexyl butanolamine, aminohexyl pentanolamine, aminohexyl hexanolamine, etc. Here again, one or both of the nitrogen atoms of the aminoalkyl alkanolamine may contain hydrocarbon substituents and particularly alkyl group or groups of from one to about 50 and preferably of from one to 20 carbon atoms each or cycloalkyl groups and particularly cyclohexyl, or mixtures thereof.

The alkanolamine is reacted with the polycarboxylic acid, anhydride, diol or ester in any suitable manner. The reaction generally is effected at a temperature above about 175° F. and preferably at a higher temperature, which usually will not exceed about 500° F., although higher or lower temperatures may be employed under certain conditions. The exact temperature will depend upon whether a solvent is used and, when employed, on dialkanolamine particular solvent. For example, with benzene as the solvent, the temperature will be of the order of 175° F., with toluene the temperature will be of the order of about F., and with xylene Preferably order of 300°–320° F. Other preferred solvents include cumene, naphtha, decalin, etc. Any suitable amount of the solvent may be employed but preferably should not comprise a large excess because this will tend to lower the reaction temperature and slow the reaction. Water formed during the reaction may be removed in any suitable manner including, for example, by operating under reduced pressure, by removing an azeotrope of water-solvent, by distilling the reaction product at an elevated temperature, etc. A higher temperature may be utilized in order to remove the water as it is being formed. The time of reaction is sufficient to effect the desired condensation and, in general, will range from one-half to about 40 hours or more. When using a higher temperature within the range hereinbefore set forth, a shorter time of reaction within the above range will be used, and vice versa. When using the dialkanolamine or the aminoalkyl alkanolamine, the time of reaction is sufficient to effect polymer formation and will be within the range hereinbefore set forth and preferably will range from about 6 to about 40 hours or more. preferably 1 to 2 mole proportions of the alkanolamine are reacted per 1 mole proportion of the acid, anhydride, diol or ester.

When the reaction product formed in the above manner is a polymer, it will comprise polyesters and, when prepared from alkanolamines containing two or more amino groups, will include polyamides in addition to the polyesters. In another embodiment, the polymer may comprise a mixed monoester-monoamide.

The reaction product generally is recovered as a viscous liquid. It may be marketed and used as such or as a solution in a suitable solvent including, for example, saturated paraffinic hydrocarbons including pentane, hexane, heptane, octane, etc., aromatic hydrocarbons including benzene, toluene, xylene, cumene, etc., decalin, alcohols, ketones, etc. However, when the product is recovered in the absence of a solvent or when the product is not sufficiently soluble in the substrate, the desired solubility may be obtained by dissolving the product in a mutual solvent. Suitable solvents for this purpose comprise phenols and particularly alkylphenols or polyalkylphenols in which the alkyl group or groups contain from six to 20 carbon atoms. The phenol may be used in a concentration of from about 5 percent and preferably from about 25 percent to about 500 percent by weight and, more particularly, from about 30 percent to about 200 percent by weight of the addition reaction product.

The addition reaction product of the present invention will have varied utility and is useful as an additive to organic substrates which undergo oxidative deterioration. The additive functions as a lubricity or extreme pressure agent and also as a flame-proofing agent. In addition, the additive serves a detergent-dispersant, peroxide decomposer, corrosion inhibitor, rust inhibitor, etc. Organic substrates include gasoline, naphtha, kerosene, jet fuel, lubricating oil, diesel fuel, fuel oil, residual oil, drying oil, grease, wax, resin, plastic, rubber, etc.

The reaction product is used as an additive in lubricating oil. The lubricating oil may be of natural or synthetic origin. The mineral oils include those of petroleum origin and are referred to as motor lubricating oil, railroad type lubricating oil, marine oil, transformer oil, turbine oil, differential oil, diesel lubricating oil, gear oil, cylinder oil, specialty products oil, etc. Other oils include those of animal, marine or vegetable origin.

The lubricating oils generally have a viscosity within the range of from 10 SUS at 100° F. to 1,000 SUS at 210° F. (SAE viscosity numbers include the range from SAE 10 to SAE 160). The petroleum oils are obtained from paraffinic, naphthenic, asphaltic or mixed base crudes. When highly paraffinic lubricating oils are used, a solubilizing agent also is used.

Synthetic lubricating oils are of varied types including aliphatic esters, polyalkylene oxides, silicones, esters of phosphoric and silicic acids, highly fluorine-substituted hydrocarbons, etc. Of the aliphatic esters, di-(2-ethylhexyl) sebacate is being used on a comparatively large commercial scale. Other aliphatic esters include dialkyl azelates, dialkyl suberates, dialkyl pimelates, dialkyl adipates, dialkyl glutarates, etc. Specific examples of these esters include dihexyl azelate, di-(2-ethylhexyl) azelate, di-3,5,5-trimethylhexyl glutarate, di-3,5,5-trimethylpentyl glutarate, di-(2-ethylhexyl) pimelate, di-(2-ethylhexyl) adipate, triamyl tricarballylate, pentaerythritol tetracaproate, dipropylene glycol dipelargonate, 1,5-pentane-diol-di-(2ethylhexanonate), etc. The polyalkylene oxides include polyisopropylene oxide, polyisopropylene oxide diether, polyisopropylene oxide diester, etc. The silicones include methyl silicone, methylphenyl silicone, etc., and the silicates include, for example, tetraisooctyl silicate, etc. The highly fluorinated hydrocarbons include fluorinated oil, perfluorohydrocarbons, etc.

Additional synthetic lubricating oils include (1) neopentyl glycol esters in which the ester group contains from three to 12 carbon atoms or more, and particularly neopentyl glycol propionates, neopentyl glycol butyrates, neopentyl glycol caproates, neopentyl glycol caprylates, neopentyl glycol pelargonates, etc., (2) trimethylol alkane esters such as the esters of trimethylol ethane, trimethylol propane, trimethylol butane, trimethylol pentane, trimethylol hexane, trimethylol heptane, trimethylol octane, trimethylol decane, trimethylol undecane, trimethylol dodecane, etc., and particularly triesters in which the ester portions each contain from three to 12 carbon atoms and may be selected from those hereinbefore specifically set forth in connection with the discussion of the neopentyl glycol esters, (3) complex esters composed of dibasic acids and glycols, especially neopentyl, neohexyl, etc., glycols further reacted or capped with monobasic acids or alcohols to give lubricants of viscosities at 210° F. of from four to 12 centistokes or higher, and (4) tricresylphosphate, trioctylphosphate, trinonylphosphate, tridecylphosphate, as well as mixed aryl and alkyl phosphates, etc.

The present invention also is used in greases made by compositing one or more thickening agents with an oil of natural or synthetic origin. Metal base synthetic greases are further classified as lithium grease, sodium grease, calcium grease, barium grease, strontium grease, aluminum grease, etc. These greases are solid or semisolid gels and, in general, are prepared by the addition to the lubricating oil of hydrocarbon soluble metal soaps or salts of higher fatty acids as, for example, lithium stearate, calcium stearate, aluminum naphthenate, etc. The grease may contain one or more thickening agents such as silica, carbon black, talc, organic modified Bentonite, etc., polyacrylates, amides, polyamides, aryl ureas, methyl N-n-octadcyl terephthalomate, etc. Another type of grease is prepared from oxidized petroleum wax, to which the saponifiable base is combined with the proper amount of the desired saponifying agent, and the resultant mixture is processed to produce a grease. Other types of greases in which the features of the present invention are usable include petroleum greases, whale grease, wool grease, etc., and those made from inedible fats, tallow, butcher's waste, etc.

Oils of lubricating viscosity also are used as transmission fluids, hydraulic fluids, industrial fluids, etc., and the novel features of the present invention are used to further improve the properties of these oils. During such use the lubricity properties of the oil are important. Any suitable lubricating oil which is used for this purpose is improved by incorporating the additive of the present invention.

Oils of lubricating viscosity also are used as cutting oils, rolling oils, soluble oils, drawing compounds, etc. In this application, the oil is used as such or as an emulsion with water. Here again, it is desired that the oil serves to lubricate the metal parts of saws, knives, blades, rollers, etc., in addition to dissipating the heat created by the contact of the moving metal parts.

Oils of lubricating viscosity also are used as slushing oils, The slushing oils are employed to protect finished or unfinished metal articles during storage or transportation from one area to another. The metal articles may be of any shape or form including steel sheets, plates, panels, coils, bars, etc., which may comprise machine parts, engines, drums, piston rings, light arms, etc., as well as farm machinery, marine equipment, parts for military or other vehicles, household equipment, factory equipment, etc. A coating which may be visible to the eye, or not, as desired, covers the metal part and protects it from corrosion, etc.

In another embodiment the addition reaction products of the present invention possess insecticidal properties with good inner-therapeutic action. They may be employed against many types of mites and insects such as, for example, Corausius larvae, Cotoneaster aphid, apple aphid, black bean aphid, aster aphid, green peach aphid, chrysanthemum aphid, pea aphid, etc. The reaction products or mixture of these may be used for the control of various larvae, mites, eggs of mites and such insects as flour beetle, mexican bean beetle, black carpet beetle, milkweed bug, german cockroaches, southern army worms, mealy bug, sow bug, citrus red spider, greenhouse red spider, various mosquitoes, yellow fever mosquito, malarial mosquito, houseflies, etc.

As hereinbefore set forth, the addition reaction products of the present invention also possess flame-proofing or flame retardant properties and, therefore, are useful in plastics, resins, coatings, paints, drying oils, etc., as well as in fibrous materials. For example, in textiles, the reaction product imparts flame retardant properties to the fabric.

The plastics and resins include polyolefins such as polyethylene, polypropylene, polybutylene, etc., mixed polymers prepared from two or more of ethylene, propylene and butylene, mixed polymers of one or more each of monoolefins and diolefins, polydiolefins including polybutadiene, polystyrene, polyvinylchloride, polycarbonate, ABS (acrylonitrile-butadiene-styrene polymer), polyphenyl ethers, polyphenyl ethers modified with styrene, polyesters, polyurethanes, epoxy resins, etc.

The concentration of the reaction product to be employed as an additive will depend upon the particular substrate in which it is to be used. In general, the additive is used in a concentration of from about 0.001 to about 25 percent by weight of the substrate and more specifically within the range of from about 0.01 to about 5 percent by weight of the substrate. When used in conventional lubricating oil, the additive generally may be employed in a concentration of from about 0.01 to about 2 percent by weight of the oil. When used in lubricating oil for more severe operations, such as hypoid gear oil, the additive is used in a concentration of from about 1 to about 20 percent or more by weight of the oil. In general, substantially the same range of additive concentration is employed when the oil is used as transmission fluid, hydraulic fluid, industrial fluid, etc. When the oil is used in the formulation of a grease, the additive is used in a concentration of from about 0.5 to 5 percent by weight of the oil. When used in cutting oil, rolling oil, drawing compound, etc., the additive may be used in a concentration of from about 0.1 to about 10 percent by weight of the oil. When used in slushing oil, the additive may be used in a concentration of from about 0.1 to about 15 percent by weight or more of the oil.

It is understood that the additive of the present invention may be used along with other additives incorporated in the organic substrate. The other additives will depend upon the particular organic substrate. For example, in lubricating oil, the additional additives may comprise one or more of viscosity index improver, pour point depressant, antifoam additive, detergent, corrosion inhibitor, antioxidant, etc. Preferred antioxidants are of the phenolic type and include tertiarybutylcatechol, 2,6-ditertiarybutyl-4-methylphenol, 2,4-dimethyl-6-tertiarybutylphenol, etc., 2-tertiarybutyl-4-methoxyphenol, 2-tertiary-4-ethoxyphenol, 3,3',5,5'-tetratertiarybutyl-diphenyl-methane, etc.

When desired, an emulsifying agent may be employed in formulations containing the additive of the present invention. Any suitable emulsifying agent can be used, including alkali metal sulfonates of petroleum solfonic acids, mahogany sulfonates, naphthenic acids, fatty acids, etc., fatty alcohol sulfonates, pentaerythritol oleates, laurates, etc. The amount of water used in the emulsified oils will depend upon the particular use of the emulsion and may range from 0.25 to 50 percent or even up to 98 percent by weight of the composition.

The additive of the present invention is incorporated in the substrate in any suitable manner and preferably the mixture is suitably agitated or otherwise mixed in order to obtain intimate admixing of the additive and of the substrate. When the substrate comprises a mixture of two or more components, the additive of the present invention may be commingled with one of the components prior to mixing with the remaining component or components of the substrate.

The following examples are introduced to illustrate further the novelty and utility of the present invention but not with the intention of unduly limiting the same.

EXAMPLE I

The reaction product of this example is a polymeric reaction product of "A" anhydride (5,6,7,8,9,9-hexachloro-1,2,3,4,4a,5,8,8a-octahydro-5,8-methano-2,3-naphthalene-dicarboxylic anhydride) with N-tallow-diethanolamine (Ethomeen T/12). The polymeric reaction product was prepared by refluxing 106.25 g. (0.25 mole) of the "A" anhydride and 92 g. (0.25 mole) of the N-tallow-diethanolamine in the presence of 200 g. of xylene. Refluxing was continued for about 7 hours at a maximum temperature of about 300° F., during which time a total of 4.5 cc. of water was collected. Following completion of the reaction, the xylene solvent was removed by distilling under water pump vacuum at a maximum temperature of about 330° F. The polymeric reaction product had a basic nitrogen equivalent of 1.31 meq./g. and a basic mole combining weight of 764, the latter corresponding to the theoretical mole combining weight of 775. 26.3 percent Chlorine was found to be contained in the additive. Average osmometric molecular weight was 2,065 at 0.43 percent as determined in chloroform.

EXAMPLE II

The reaction product of this example was prepared by reacting "A" anhydride with N,N'-dioctyl-N-hydroxyethyl-aminoethyl-ethanolamine. The alkanolamine was prepared by the oxyethylenation of N,N'-dioctyl-ethylenediamine. The polymeric reaction product was prepared by refluxing 47.4 g. (0.125 basic equivalent) of the aminoethyl ethanolamine and 53 g. (0.125 acidic equivalent) of the "A" anhydride in the presence of 200 g. of xylene. The refluxing was continued for about 9 hours and a total of 2 cc. of water was collected. The xylene solvent was removed by distilling under water pump vacuum at a temperature of about 400° F. The polymeric reaction product had a basic nitrogen equivalent of 2.33 meq./g. and a basic mole combining weight of 429.

EXAMPLE III

The reaction product of this example was prepared by reacting "A" anhydride with N-diethyl-ethanolamine. The reaction was effected by refluxing 106.25 g. (0.25 mole) of "A" anhydride and 59 g. (0.5 mole) of N-diethyl-ethanolamine in the presence of 100 g. of toluene. 4.5 cc. of water was collected. The reaction product was recovered as a greasy product having a basic nitrogen equivalent of 2.97 meq./g. which corresponds to the theoretical basic nitrogen equivalent of 3.19 meq./g.

EXAMPLE IV

The reaction product of this example is a polymeric reaction product prepared by reacting "Chlorendic" anhydride with N-tallow-diethanolamine (Ethomeen T/12). The polymeric reaction product was prepared by refluxing 185.4 g. (0.5 mole) of "Chlorendic" anhydride and 184 g. (0.5 mole) of N-tallow-diethanolamine. The refluxing was continued for 6 hours at a temperature of about 310° F. and a total of 9 cc. of water was collected. The xylene solvent was removed by heating the product at 275° F. under water pump vacuum. The polymeric reaction product has a basic nitrogen equivalent of 1.10 meq./g.

EXAMPLE V

The reaction product of this example was prepared by reacting the diol corresponding to "Chlorendic" acid, N-tallow-diethanolamine (Ethomeen T/12) and dodecenyl succinic anhydride. The diol is prepared by reacting hexachloro-cyclopentadiene with 1,4-butenediol. The polymeric reaction product is prepared by refluxing 45.13 g. (0.125 mole) of the "Chlorendic" diol, 48 g. (0.125 mole) of N-tallow-diethanolamine and 70.5 g. (0.25 mole) of dodecenyl succinic anhydride. The refluxing is effected at a temperature of about 340° F. for about 8 hours and a total of 4.5 cc. of water is collected. The xylene solvent is removed by distilling at a temperature up to about 350° F. under water pump vacuum. The product is recovered as a very heavy amber oil containing 16.3 percent chlorine corresponding to the theoretical content of 16.7 percent.

EXAMPLE VI

The reaction product of this example was prepared by reacting "A" anhydride, N-tallow-diethanolamine and dodecenyl succinic anhydride. The polymeric reaction product was prepared by refluxing 53 g. (0.125 moles) of "A" anhydride, 92 g. (0.25 mole) of N-tallow-diethanolamine and 32.78 g. (0.125 moles) of dodecenyl succinic anhydride. A total of 4.5 cc. of water was collected. Following completion of the reaction, the reaction mixture was distilled under water pump vacuum to remove the xylene solvent. A 50 percent lubricating oil solution of the product was made. The reaction product solution had a basic nitrogen equivalent of 0.74 meq./g.

EXAMPLE VII

The reaction product of this example is prepared by reacting an ethyl ester of "B" acid (5,6,7,8,9,9-hexachloro-1,2,3,4,4a,5,8,8a-octahydro-1,4,5,8-dimethano-2,3-naphthalenedicarboxylic acid) with N-decyl-aminopropyl-propanolamine. The ester of "B" acid and ethyl alcohol is prepared by refluxing equal mole proportions of the acid and alcohol under conditions to liberate water, the water being removed simultaneously during the reaction. The resulting ester and N-decyl-aminopropyl-propanolamine are refluxed in the presence of xylene solvent to liberate water and to form the polymeric reaction product.

EXAMPLE VIII

The reaction product of this example is prepared by reacting "A" acid and N-soya-diethanolamine. The reaction is effected by refluxing equal mole proportions of the "A" acid and N-soya-diethanolamine and removing the water formed during the reaction. The resultant polymeric reaction product is recovered as an amber oil.

EXAMPLE IX

In one embodiment the reaction products of the present invention are used as additives in lubricating oil. One method of evaluating lubricating oils is by the Falex machine. This procedure is described in detail in a book entitled "Lubricant Testing" authored by E. G. Ellis and published by Scientific Publications (Great Britain) Limited, 1953, pages 150–154. Briefly, the Falex machine consists of a rotating pin which runs between two "V" shape bearings which are spring loaded against the pin and provided with means for varying the load. The oil to be tested is poured into a metal trough in which the pin and bearings are partly submerged. The machine was operated for 5 minutes each at 250 and 500 pound loads and then 45 minutes at 750 pound load. The data collected includes the temperature of the oil at each of the loads, as well as the wear which is determined by a ratchet wheel arrangement in which the teeth are advanced in order to maintain the desired load. Each tooth is equivalent to approximately 0.000022 inches. Preferred additives are those which impart low temperature, low torque and low wear to the oil.

In another series of tests the machine was operated for 5 minutes at each load from 250 pounds to seizure at 250 pound increments. The maximum load and the time in minutes at this load to seizure are reported, as well as the temperature of the oil. In this case the higher temperature is preferred because it means that the oil is operating satisfactorily at a higher temperature.

The lubricating oil used in this example is dioctyl sebacate synthetic lubricating oil marketed under the trade name of "Plexol 201."

Run No. 1 in the following table is a run made using the "Plexol" not containing an additive and thus is the blank or control run.

Run No. 2 is a run made using another sample of "Plexol" which had been added 2 percent by weight of the reaction product prepared as described in example I.

Run No. 3 is a run made using another sample of "Plexol" which had been added 2 percent by weight of the reaction product prepared as described in example II.

Run No. 4 is a run made using another sample of "Plexol" which had been added 2 percent by weight of the reaction product prepared as described in example III.

ASTM–CFR (Erdco) Coker Test D–1660 using 6 p.p.h. fuel flow. Commercial diesel fuel has been used as the testing medium. The preheater temperature has been set at 400° F. The filter temperature has been set at 932° F. 0.001 percent by weight of the additive has been added to the fuel. The time in minutes to reach the corresponding differential (ΔP) of mercury pressure is reported. While the control sample of the fuel containing no additive reached the differential pressure of 25 inches of mercury in 87 minutes, 0.001 percent by weight of the additives of the present invention reduced the filter plugging considerably, as shown by the data in the following table.

TABLE I

| Run No. | Temperature, °F. | | | Torque, lbs. | | | Wear, teeth | | | Seizure conditions | | |
|---|---|---|---|---|---|---|---|---|---|---|---|---|
| | 250 | 500 | 750 | 250 | 500 | 750 | 250 | 500 | 750 | Load | Time | Temp., °F. |
| | 150 | 231 | 490–S | 3–4 | 9–10 | 18–S | 0 | 0 | S | 750 | 2 | 490 |
| | 145 | 215 | 463 | 4–5 | 10–14 | 21–40 | 0 | 0 | 166 | 1,750 | 1.1 | 72 |
| | 166 | 240 | 513 | 4–6 | 11–13 | 22–37 | 0 | 0 | 204 | 1,500 | 2.0 | 715 |
| | 147 | 218 | 513 | 4–6 | 10–12 | 25–35 | 0 | 0 | 205 | 1,500 | 2.0 | 725 |

NOTE.—S=seizure.

From the above data, it will be seen that the dioctyl sebacate without additive (Run No. 1) underwent seizure at a load of 750 pounds. The samples containing the additives of the present invention did not undergo seizure until loads of 1,500–1,750 pounds.

EXAMPLE X

Another series of evaluations were made in the same manner as described in example IX, except that the lubricating oil was a mineral oil marketed commercially by A. H. Carnes Company as "Carnes 340 White Oil." Typical specifications of this oil include the following:

| | |
|---|---|
| Distillation range, °F. | 740–975 |
| Specific gravity at 60° F. | 0.8836 |
| Viscosity at 100° F. | 360 |
| at 210° F. | 52.2 |
| Flash point, COC, °F. | 440 |
| Pour Point, °F. | –20 |
| Refractive index at 68° F. | 1.4805 |
| Saybolt color | +30 |

Run No. 5 in the following table is a run using the white oil not containing an additive and thus is the blank or control run.

Run No. 6 is a run using another sample of the white oil to which had been added 2 percent by weight of the reaction product of example I.

Run No. 7 is a run using another sample of the white oil to which had been added 2 percent by weight of the reaction product of example II.

Run No. 8 is a run using another sample of the white oil to which had been added 2 percent by weight of the reaction product of example III.

Here again, it will be noted that the use of the additives considerably increased the load at which seizure occurred as compared to the oil without additive (Run No. 5).

EXAMPLE XI

High temperature detergency and dispersant properties of the reaction products of the invention have been tested in

TABLE III

| | | Time Minutes | ΔP inches of Hg |
|---|---|---|---|
| Run No. 1 | Blank fuel No additive | 87 | 25 |
| Run No. 1 | 0.001% product of example I | 300 | 1.1 |
| Run No. 2 | 0.001% product of example IV | 300 | 1.0 |
| Run No. 3 | 0.001% of active ingredient of example VI | 300 | 6.5 |

The above data illustrate that the reaction products of the present invention effectively reduce filter plugging of the fuel.

EXAMPLE XII

An insecticidal composition is prepared by dissolving 1 g. of the reaction product of example III in 2 cc. of benzene and emulsifying the resultant solution with 100 cc. of water using Triton X–100 as the emulsifying agent. The resulting emulsion is sprayed into a cage containing houseflies and results in substantial knockdown.

EXAMPLE XIII

The reaction product of this example is prepared by reacting "A" acid with N-octyl-ethanolamine. The reaction is effected by heating and mixing two mole proportions of the alkanolamine with one mole proportion of the "A" acid at a temperature of about 400° F. for a period of about 15 minutes, while nitrogen is being passed through the reaction mixture to remove the water of reaction, following which the reaction mixture is further heated and mixed at about 400° F. under a vacuum of about 15 mm. Hg. for about an additional 15 minutes in order to complete the reaction. The product is recovered as a viscous liquid.

I claim as my invention:

TABLE II

| Run No. | Temperature, °F. | | | Torque, lbs. | | | Wear, teeth | | | Seizure conditions | | |
|---|---|---|---|---|---|---|---|---|---|---|---|---|
| | 250 | 500 | 750 | 250 | 500 | 750 | 250 | 500 | 750 | Load | Time | Temp., °F. |
| 5 | 172 | 350–S | | 5–6 | 30–S | | 0 | S | | 425 | 0.1 | 275 |
| 6 | 182 | 267 | 535 | 5–6 | 13–15 | 22–45 | 0 | 2 | 60 | 1,750 | 4.8 | 800 |
| 7 | 163 | 303 | 683 | 4–5 | 15–18 | 25–48 | 0 | 0 | 116 | 1,500 | 2.0 | 675 |
| 8 | 176 | 365 | 575 | 5–6 | 17–22 | 21–38 | 0 | 0 | 281 | 1,250 | 1.0 | 650 |

NOTE.—S=seizure.

1. The reaction product formed by the condensation at a temperature of from about 175° F. to about 500° F. and for a time of from about ½ to about 40 hours of 1 to 2 mole proportions of an alkanolamine selected from the group consisting of monoalkanolamine containing from two to about 20 carbon atoms, N-alkyl-alkanolamine, N,N-dialkyl-alkanolamine, N-alkyl-dialkanolamine and aminoalkylalkanolamine in which each alkyl contains from one to 20 carbon atoms with one mole proportion of a compound selected from the group consisting of polyhalopolyhydropolycyclicdicarboxylic acid, corresponding anhydride, and ester of said acid, said acid having the structural formula:

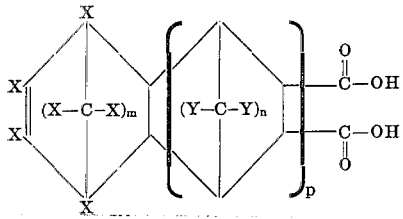

wherein X is halogen, hydrogen, or alkyl of from one to 10 carbon atoms, at least two of the X's being halogen, Y is halogen, hydrogen or alkyl of from one to 10 carbon atoms, $m$ is an integer of from one to four, $n$ ranges from zero to four and $p$ ranges from zero to four.

2. The reaction product of claim 1 wherein said compound is 5,6,7,8,9,9-hexachloro-1,2,3,4,4a,5,8,8a-octanhydro-5,8-methano-2,3-naphthalenedicarboxylic acid.

3. The reaction product of claim 1 wherein said compound is 5,6,7,8,9,9-hexachloro-1,2,3,4a,5,8,8a-octahydro-5,8-methano-2,3-naphthalenedicarboxylic anhydride.

4. The reaction product of claim 1 wherein said compound is 5,6,7,8,9,9-hexachloro-1,2,3,4,4a,5,8,8a-octahydro-1,4,5,8-dimethano2,3-naphthalenedicarboxylic acid.

5. The reaction product of claim 1 wherein said compound is 5,6,7,8,9,9-hexachloro-1,2,3,4,4a,5,8,8a-octahydro-1,4,5,8-dimethano-2,3-naphthalenedicarboxylic anhydride.

6. The reaction product of claim 1 wherein said compound is 1,4,5,6,7,7-hexachlorodicyclo-(2.2.1)-5-heptene-2,3-dicarboxylic acid.

7. The reaction product of claim 1 wherein said alkanolamine is a monoalkanolamine containing from two to about 20 carbon atoms.

8. The reaction product of claim 1 wherein said alkanolamine is N-alkyl-dialkanolamine in which said alkyl group contains from one to 20 carbon atoms.

9. The reaction product of claim 8 wherein said alkanolamine is N-alkyl-diethanolamine in which said alkyl group contains from one to 20 carbon atoms.

10. The reaction product of claim 9 wherein said alkanolamine is N-tallow-diethanolamine.

11. The reaction product of claim 1 wherein said alkanolamine is N-dialkyl-alkanolamine in which said alkyl groups contain from one to 20 carbon atoms each.

12. The reaction product of claim 11 wherein said alkanolamine is N-diethyl-ethanolamine.

13. The reaction product of claim 1 wherein said alkanolamine is an aminoalkyl alkanolamine.

14. The reaction product of claim 13 wherein said alkanolamine is an aminoethyl ethanolamine.

15. The reaction product of claim 13 wherein said alkanolamine is N,N'-dialkyl-aminoethyl-ethanolamine in which said alkyl groups contain from one to 20 carbon atoms each.

16. The reaction product of claim 13 wherein said alkanolamine is N,N'-dioctyl-N-hydroxyethyl-aminoethyl ethanolamine.

17. The reaction product of claim 1 being a polyester resulting from the condensation reaction of one mole proportion of an ethyl ester of 5,6,7,8,9,9-hexachloro-1,2,3,4,4a,5,8,8a-octahydro--octahydro-1,4,5,8,-dimethano-2,3-naphthalenedicarboxylic acid with from 1 to 2 mole proportions of N-decyl-aminopropyl-propanolamine at a temperature of from about 175° F. to about 500° F. and for a time of from about ½ to about 40 hours or more.

* * * * *